United States Patent [19]
Dunn, Jr.

[11] 4,331,637
[45] May 25, 1982

[54] PROCESS FOR PURIFYING ALUMINUM CHLORIDE

[75] Inventor: Wendell E. Dunn, Jr., Spearfish, S. Dak.

[73] Assignee: Reynolds Metals Company, Richmond, Va.

[21] Appl. No.: 255,355

[22] Filed: Apr. 20, 1981

[51] Int. Cl.³ .............................................. C01F 7/62
[52] U.S. Cl. .................................. 423/135; 423/496; 423/133
[58] Field of Search ............... 423/111, 133, 135, 136, 423/496

[56] References Cited

U.S. PATENT DOCUMENTS 1,605,098 11/1926 Dearborn .......................... 423/136
1,875,105 8/1932 Muggleton ......................... 423/136
1,982,194 11/1934 Broden et al. ..................... 423/136
3,865,920 2/1975 Dunn .................................. 423/74

Primary Examiner—Herbert T. Carter
Attorney, Agent, or Firm—Lyne, Girard & McDonald

[57] ABSTRACT

A method for purifying with respect to iron, aluminum chloride produced via the chlorination of aluminum bearing ores or materials which also contain iron. The process comprising the steps of:
1. chlorinating the aluminum value containing material in a manner which produces a gaseous product containing both ferric chloride and aluminum chloride;
2. oxidizing at least a portion of the ferric chloride to particulate iron oxide;
3. removing the iron oxide from the gaseous product;
4. reducing any remaining ferric chloride to ferrous chloride, using reduced iron oxide, e.g. iron powder;
5. condensing the ferrous chloride along with at least about 10% of the available aluminum chloride to assure removal of substantially all iron chloride; and
6. condensing the remaining about 80% of the available aluminum chloride as pure product.

1 Claim, No Drawings

PROCESS FOR PURIFYING ALUMINUM CHLORIDE

BACKGROUND OF THE INVENTION

The growing scarcity of conventional bauxites suitable for Bayer process production of alumina has generated a search for other sources of aluminum values and other methods of processing the variety of aluminum value sources that exist including low grade bauxites, kaolins, fly ash and other aluminum value containing ores and materials. One such approach involves the chlorination of such aluminum value containing materials followed by direct hydrolysis of the aluminum chloride thus formed, or alternatively, decomposition of the $AlCl_3$ into alumina which can be used in conventional electrolytic cells.

Energy considerations appear to favor high temperature chlorination as a route to aluminum chloride which can be oxidized to obtain alumina and recover the chlorine values for recycle. The commercially successful titanium chloride pigment process has demonstrated the effectiveness of a recycle process using high temperature chlorination with a solid reducing agent followed by separation of the titanium tetrachloride from the accompanying noncondensible chlorinator gases and purification before oxidation.

Researchers seeking to save energy in the electrolytic reduction step of aluminum production by using aluminum chloride instead of alumina in the cell reduction have found that $AlCl_3$ purification difficulties have to date dictated that alumina be the starting material for the production of the chloride instead of natural bauxite ores or other aluminum value containing materials which also incorporate substantial quantities of various impurities. Hence there has been a twofold need for a process to produce alumina, both as a material to be chlorinated via a chloride reduction route to aluminum metal and as the starting material for direct reduction in conventional cells. When one considers the huge investment in plants now using alumina as the source of aluminum metal, it is obvious that steps must be taken to provide a continuing source of alumina even as the grade and type of aluminum value sources changes. A process which could provide such a source of alumina while at the same time possessing the capability of providing $AlCl_3$ for chloride reduction cells would seem to provide an optimum solution to the problem.

Studies have been made and process steps proposed to prechlorinate bauxites or kaolins to remove one or more impurities, usually iron oxides and sometimes titania; frequently using HCl and sometimes a limited amount of chlorine with a reducing agent, frequently carbon monoxide. The attempts to remove iron fall far short of reaching the alumina purity which is necessary for producing "cell grade" material.

Proposals have been made to selectively condense the chlorides from a chlorinator exit gas stream, but it is now well established that the formation of iron-aluminum chloride complexes will invariably defeat attempts at simple selective condensation. Not only has the iron impurity level remained excessive in such attempts, but it is generally found that the concentration of titanium and silicon chlorides in the condensed aluminum chloride is much higher than would be expected from the wide temperature differences in their boiling points and certainly higher than can be tolerated in the electrolytic cells.

Proposals have been made to rectify a molten mixture of chlorides, but the corrosive nature of aluminum chloride makes heat transfer across metal surfaces difficult and the propensity of ferric and aluminum chloride to attack carbon by forming intercalation compounds makes the use of generally more corrosion resistant carbon-containing materials virtually impossible. The low price of aluminas, furthermore, inveighs against the energy expenditure for rectification.

In processes analogous to the chloride titanium pigment process which are proposed to produce pigment-sized aluminas, the jet burners needed are not only complex and expensive but produce a very fine alumina which is difficult to collect and handle. The surface areas are below the high surface areas made from aluminum chloride or hydroxide dehydration as in the Bayer process, but the particle size is generally too small for easy handling and cell introduction.

Finally, efforts to recycle chloride values from the impurities are faced with expensive separate oxidation equipment and a silica particle size problem even worse than that of the alumina oxidation reactors.

It is clear from the foregoing that a simple alumina producing analogue of the chloride pigment/chlorine recycle process is neither desirable nor commercially realistic. Aluminum chloride is too near ferric chloride in physical properties, too difficult to separate from ferric chloride, too different in its oxidation properties while the alumina to be produced is too inexpensive a commodity to make a direct analog of the titania process economically viable.

Objects of the Invention

It is therefore an object of this invention to provide an economically attractive chlorination process for the production of "cell grade" alumina from a variety of alumina value sources including, for example, bauxite, low grade ores such as clay and other less conventional sources such as fly ash.

SUMMARY OF THE INVENTION

The present invention provides a method for purifying with respect to iron, aluminum chloride produced via the chlorination of aluminum bearing ores or materials which also contain iron. The process comprises the steps of:

1. chlorinating the aluminum value containing material in a manner which produces a gaseous product containing both ferric chloride and aluminum chloride;
2. oxidizing at least a portion of the ferric chloride to particulate iron oxide;
3. removing the iron oxide from the gaseous product;
4. reducing any remaining ferric chloride to ferrous chloride, using reduced iron oxide, e.g. iron powder;
5. condensing the ferrous chloride along with at least about 10% of the available aluminum chloride to assure removal of substantially all iron chloride; and
6. condensing the remaining about 80% of the available aluminum chloride as pure product.

DETAILED DESCRIPTION

In the following description, numerous parameters such as times of reaction, temperature, pressures, reactor dimensions, reagent concentration etc. are presented. It should be apparent that these parameters are specified for certain conditions of operation and that the skilled artisan can evolve procedures and sets of parameters outside of those specified. Thus, unless stated as necessary or essential the parameters specified should be considered primarily as exemplary operative conditions which are optional and whose modification is well within the skill of art once the process described is made available.

This invention comprises a process which takes an alumina value containing material, preferably a bauxite or clay, of fluidizable particle size, which also contains substantial amounts of iron, chlorinates it and condenses the product chlorides in a manner which permits the production of pure aluminum chloride. According to a preferred technique, chlorination is achieved in a process which takes the alumina value contained material dehydrates it at a temperature of between about 500° and 1300° K., mixes it with portions of coal and coke and passes it into a staged fluidized bed where the ore is dehydrated and brought to a desired temperature to maintain heat balance in a succeeding reactor, i.e. a 1st chlorinator, where the ore is *partially* chlorinated.

Under certain circumstances, as an energy-saving measure, it may be desirable to preheat the alumina value source material prior to dehydration. Such a preheating step would be performed in a fluidized bed. The function of such a step is to raise the temperature of the material to somewhat below the level at which dehydration would occur to achieve drying, but not dehydration. Such a drying or preheat would be performed at a temperature above about 110° C. and preferably between about 250° C. and the temperature of the dehydration stage. Heat values for such preheating might be derived from other stages of the process as will be described hereinafter.

Dehydration is simarly performed in a fluidized bed environment. Air may be used as the fluidizing medium or a mixture of nitrogen and oxygen. If the latter mixture is used care must be exercised not to use an excess of $O_2$ as this may result in sintering. A mixture of $N_2/O_2$ of 60/40% will provide optimum safe results.

Carbon in the form of coal or coke is introduced into the dehydration bed as a source of combustion for heat. Carbon addition in the range of from about 1 to about 25% of the total dehydration charge will produce satisfactory results. It is preferred to use a carbon charge of between about 15 and 25% and optimum results are obtained at a level of 20% carbon in the mix.

The temperature of the dehydration will of course depend to some extent on residence time; however, at commercially feasible residence times of from about ½ to about 1 hour, temperatures in the range of 500°–1300° K. provide useful results. It is preferred to operate the dehydration at a temperature above about 800° C. as this provides rapid dehydration and permits a commercially useful residence time.

The dehydrator can be operated at atmospheric pressure or under high pressures and the determination as to which condition is desirable for a particular operation is well within the skill of the art.

In the first chlorinator the ore-carbon mixture is attacked by chlorine introduced to fluidize the bed and react with the iron oxides selectively, according to the reaction

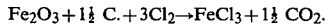

$Fe_2O_3 + 1\frac{1}{2} C. + 3Cl_2 \rightarrow FeCl_3 + 1\frac{1}{2} CO_2$.

The degree of attack is regulated by the relative amounts of ore and chlorine introduced so that only iron and small amounts of titania are attacked, the residuals of these oxide impurities and the remaining alumina and silica are then passed to a second chlorinator along with the carbon which is in great excess over the amount needed to chlorinate only the iron but in stoichiometric balance to later accept all the oxygen released in the chlorination of the remaining ore.

The remaining present in this first chlorinator include in addition to the alumina value source material carbon and the fluidizing and reacting chlorine. The carbon used in both this chlorinator and in the second chlorinator described below should have a surface area of between about 10 and 20 i.e. pass on 8×52 mesh. Carbon is present in the bed at from about 10 to about 30% by weight with 15–25% by weight being preferred.

The fluidizing chlorine should be such as to produce a bed velocity of between about 0.03' and 1.25'/sec. It is generally preferred to operate the bed below about 1'/sec. The fluidization rate will of course, as with so many other of the parameters, depend upon the particle size distribution of the material under treatment, bed depth, etc. and that mentioned immediately hereinabove is largely exemplary and should not be interpreted as essential. Under normal conditions a positive pressure if between 29 PSIA and 3 atmospheres absolute should be applied to the bed to assure adequate process flow. Positive pressure will also assist the reaction kinetics and hence is desirable.

The temperature of this first chlorinator will depend to some extent on the dimension of the reactor vessel, the bed velocity and the character of the material being treated. Temperatures on the order of about 800° C. to about 1100° C. produce useful results under most operating conditions.

Bed depths of between about 2' and 8' produce satisfactory results. The function of this first stage chlorinator is defined as being able to accomplish chlorination and removal of substantially all of the iron present in the alumina value source without removal of any of the aluminum values. This is, of course, an ideal which to date has not been achieved. Consequently, the first chlorinator is operated under conditions which result in chlorination of at least about 80–85% of the iron in the alumina value source (hereinafter AUS) and preferably up to 98% of the iron. Because of the thermodynamics of the system the hierarchy of chlorination is as follows: Fe, Ti, Si and Al. If it is desired to recover TiCl4 from the process stream as described hereinafter care must be exercised not to permit excessive chlorination of Ti in this first stage. In summary then what must be established in this first chlorinator is a set of reaction conditions which results in chlorination of about 80% or more of the iron and as much as the Titanium as one is willing to lose. Si and Al chlorination must be minimized and the process parameters described hereinabove permit this level of Fe chlorination, although it is clearly possible to define alternative conditions which will yield desirable results.

The gases leaving the first chlorinator pass upward from the bed into a gas space 16 above the reaches of the expanded fluidized bed wherein a second reaction is continually conducted, ps

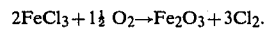

$2FeCl_3 + 1\frac{1}{2} O_2 \rightarrow Fe_2O_3 + 3Cl_2$.

This reaction constitutes the first step in the purification process of the present invention, oxidation of the ferric chloride. This reaction is fed oxygen from one or more jets entering from the circumference of the reactor. The products from this reaction zone are ferric oxide, unreacted ferric chloride and dust from the carbon-ore mixture fluidized below. In addition, other oxidizable chlorides may be added to the cloud mixture to be oxidized simultaneously. In order to control the temperature, ferric chloride is recycled via feeding means after its condensation to absorb heat generated by the oxidation and any heat radiated from the chlorinator bed below. By control of the oxygen excess, it is possible to maintain a temperature high enough to accomplish rapid equilibration of the ferric chloride oxidation reaction and yet hold the gas space temperature to a reasonable operating margin above the rapid equilibration temperature. The detailed operation of a cloud reactor is described in Dunn's U.S. Pat. No. 3,865,920. Cloud temperatures on the order of between about 710° C. and about 1200° C. will achieve the required oxidation levels. Oxygen feed in reactors of the size and type described above on the order of 0.1 to 10%. Excess will also provide useful results. Aforementioned U.S. Pat. No. 3,865,920 should be consulted for additional cloud oxidation reaction conditions and to this end this patent is incorporated herein by reference.

The gases exiting from the cloud may be cooled in a flue scrubbed by a separable scrubbing agent, such as coarse sand. After cooling to a temperature near but above the condensation temperature of the unreacted ferric chloride, i.e. about 400° C. the gases are cycloned to remove the ferric oxide, the other oxides made in the cloud, the scrubbing agents and dusts from the process which are introduced into the cloud along with condensed ferrous chloride, alumina chloride complex and ferric chloride from both the first and second reactors.

The gases passing to the cyclone via the scrubbed flue contain the unreacted ferric chloride (gaseous dimer), chlorine and combustion gas. The excess oxygen may be held to low values and may even be further reacted as the gases pass down the flue and are cooled because the equilibrium will shift favoring the oxide. As these gases are further cooled to below the condensation point of the unreacted ferric chloride, i.e. <305° C. the ferric chloride condenses to a solid which can be cycloned at the end of the scrubbed flue along with the additional scrubbing solids introduced. The solids should either be such that they can be separated from the fine condensed ferric chloride which is to be recycled or be solids which can be introduced into the cloud with the ferric chloride and which, being of large size, will fall into the fluidized bed below and constitute a feed stream.

The chlorine released by the oxidation of the ferric chloride and any other chlorides oxidized in the cloud is transported to the second chlorinator where they are comingled with the chlorine from the aluminum chloride oxidation and sent into the bed gas distributor.

Solids overflow from the first chlorinator is sent to the second chlorinator where the chlorination is continued, approaching total chlorination of the alumina, silica and titania remaining. An overflow is used to prevent build-up of the unchlorinatable materials introduced and to maintain a constant bed level. The bed will operate at an aluminum concentration close to the concentration entering the second reactor for ores which do not chlorinate selectively, i.e. at the concentration of the first reactor. This will be slightly above that of the preheated fresh ore since iron oxides have been substantially removed.

The second chlorinator is operated at a temperature close to the natural heat balance obtained from the heat of the reaction and the sensible heat of the ore and coke entering from the first reactor. The upper operating temperature limit, about 1150° C., is set by the approach to fusion of the silica component, but the operation of the reactor will not need to approach this temperature since the natural heat balance is well below this maximum temperature and there is no reason to increase the temperature excessively by oxygen addition. The second reactor can be operated at a temperature of between about 850° and 1150° C. with a preferred operating range of between about 950° and 1100° C.

The gaseous products of the second reactor, in addition to the desired aluminum chloride product, contain small amounts of ferric chloride, large amounts of combustion gas and silicon tetrachloride, lesser amounts of titanium tetrachloride and small amounts of chlorine which has not reacted with the ore in passage through the bed. The amount of chlorine break-through will depend upon the temperature and depth of the bed but can be held to less than 2% of the chlorine fed. Control of bed depth to between about 2 to about 8 feet will limit sintering and minimize chlorine blowthrough. Bed velocities of between about 0.5 and 0.7'/sec. provide optimum results, but bed velocity may lie outside this range. In order to avoid excessive iron condensing with the aluminum chloride in one of several complexes which can form and condense from the gas phase, the iron chloride is reduced by the addition of metallic iron or iron powder which rapidly converts at the high temperature existing above the bed to ferrous chloride by reacting with chlorine from the exiting gases as well as chlorine from the ferric chloride which is present. This reaction constitutes the second step in the process of the present invention.

Where the bed reactivity is sufficient it is possible to operate in a region where nearly all of the iron chloride produced is ferrous chloride, in which case the iron needed to reduce the remaining ferric chloride is much less. However, the amount will be small in either case and a convenient operating condition is sought to minimize both carbon consumption (affected b the $CO_2/CO$ ratio of the combustion gas produced) and iron addition needed to reduce the ferric chloride and react with the chlorine breaking through the bed.

The advantage of iron addition is that it recaptures all of the chlorine as opposed to the addition of a hydrocarbon or hydrogen which would yield HCl. The iron powder may be produced by reduction of the iron oxide produced in the first step. Iron powder on the order of $10\mu$ is appropriate for this addition.

Following the iron addition, the gases pass into a scrubbed flue where the iron complexes of ferrous chloride and aluminum chloride condense. Here the wall temperature will stay at the condensation point of solid aluminum chloride, below 180° C., depending upon the system pressure. The gas temperature is kept well above the condensation point of aluminum chloride through the cyclone which removes the iron chloride complex, dust, and scrubbing solids. This complex chloride is returned to the cloud reactor to be oxidized. If the scrubbing solids used can serve as feed, e.g. large sized dried ore, they may accompany the iron chloride complex. If scrubbing solids which are not aluminous ore are used, these may be separated from the iron chloride complex by elutriation or pass through the system and overflow the second chlorinator and be removed before recycle of aluminum ore values. The latter has advantages for keeping control of bed heights and compositions.

Following the cyclone removing the iron complex, a fluidized condenser receives the gas stream and cools it to a point where appreciable condensation of the aluminum chloride takes place. Temperature is controlled by limiting the flow of coolant to the fluidized bed which is operated at high velocity (i.e. from about 2 to about 10'/sec) with large particles (i.e. from about 1/16" to about ⅛") keep heat transfer surfaces clean and elutriate the condensed aluminum chloride. This first aluminum chloride cut is recycled to the second chlorinator chlorine feed stream to act as a catalyst for the reaction. The function of the aluminum chloride recycle is to remove all traces of any solid aluminum chloride-iron chloride complex that might have passed the earlier cyclone.

At the end of the flue entering the condenser, the gaseous product should be at a temperature of 260° C., but above the temperature at which $AlCl_3$ will condense. This later temperature will depend to great extent on the vapor pressure of the components, especially $AlCl_3$ in the gas and can only be regulated in balance with that pressure.

It is the aim of this condensation stage to condense all of the iron values present in the gas and between about 10 and 20% of the $AlCl_3$ to insure total iron removal. At a condensation temperature of about 160° C. about 10% of the $AlCl_3$ will condense and generally yield satisfactory results.

The gas stream now contains, in addition to the combustion gases and inerts, aluminum chloride in large concentration, silicon tetrachloride also in large concentration and titanium tetrachloride in lesser concentration.

Condensation of titanium tetrachloride is a routine process operation now practiced everywhere, but silicon tetrachloride condenses over a much lower temperature range. Other liquids are limited in the degree to which they may be removed from the process gas stream by their liquid range. Beyond this limit to refrigeration of the tail gas stream to recover these two chlorides, one must use adsorptive and/or destructive methods to avoid environmental problems.

Since the process proposes to recover titanium tetrachloride values instead of oxidizing them for chlorine recovery as is proposed for silicon tetrachloride it is necessary to keep the titanium chloride out of the silicon chloride.

The condensers used for the condensation and separation of $TiCl_4$ and $SiCl_4$ are physically arranged so that the liquid from the second (colder) titanium condenser is able to pass by gravity into the higher temperature condenser where the silicon tetrachloride which has gone into solution with the titanium tetrachloride is revolatilized and enters the final and lowest temperature gas stream. The chlorine is probably flashed to a large extent from the titanium stream and ends up in the silicon tetrachloride where it is automatically recycled as the silicon tetrachloride is volatilized into the oxidation cloud and back into use in the process.

Should the titanium tetrachloride contain chlorine, the chlorine may either be allowed to remain with the crude tianium tetrachloride to be removed when the user distills it or it may be flashed by vacuum into the cold silicon tetrachloride.

The process avoids distillation of by-products to separate. Purification of the product aluminum chloride can be by any suitable technique.

What is claimed is:

1. A method for purifying with respect to iron, aluminum chloride produced via the chlorination of aluminum bearing ores or materials which also contain iron comprising the steps of:
   (a) chlorinating the aluminum value containing material in a manner which produces a gaseous product containing both ferric chloride and aluminum chloride;
   (b) oxidizing at least a portion of the ferric chloride to particulate iron oxide;
   (c) removing the iron oxide from the gaseous product.
   (d) reducing remaining ferric chloride to ferrous chloride, using reduced iron oxide;
   (e) condensing the ferrous chloride along with between about 10% to 20% of the available aluminum chloride to assure removal of substantially all iron chloride; and
   (f) condensing the remaining aluminum chloride as pure product.

* * * * *